United States Patent
Hwangbo et al.

(10) Patent No.: US 12,235,653 B2
(45) Date of Patent: Feb. 25, 2025

(54) ROBOT AND CONTROL METHOD THEREOF

(71) Applicant: SAMSUNG ELECTRONICS CO., LTD., Suwon-si (KR)

(72) Inventors: Minsu Hwangbo, Suwon-si (KR); Hyunseok Hong, Suwon-si (KR); Yeongrok Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 217 days.

(21) Appl. No.: 18/108,390

(22) Filed: Feb. 10, 2023

(65) Prior Publication Data

US 2023/0185308 A1 Jun. 15, 2023

Related U.S. Application Data

(63) Continuation of application No. PCT/KR2021/010331, filed on Aug. 5, 2021.

(30) Foreign Application Priority Data

Aug. 11, 2020 (KR) ........................ 10-2020-0100228

(51) Int. Cl.
*G05D 1/00* (2024.01)
*G01S 7/48* (2006.01)
(Continued)

(52) U.S. Cl.
CPC .......... *G05D 1/0246* (2013.01); *G01S 7/4808* (2013.01); *G01S 17/89* (2013.01); *G01S 17/931* (2020.01); *G05D 2111/17* (2024.01)

(58) Field of Classification Search
None
See application file for complete search history.

(56) References Cited

U.S. PATENT DOCUMENTS 9,182,763 B2  11/2015  Park et al.
9,283,670 B2   3/2016  Sun et al.
(Continued)

FOREIGN PATENT DOCUMENTS

CN  110561498 A  12/2019
CN  211012988 U   7/2020
(Continued)

OTHER PUBLICATIONS

Communication dated Jun. 24, 2024, issued by the National Intellectual Property Administration, PRC in counterpart Chinese Application No. 202180056307.1.
(Continued)

*Primary Examiner* — Todd Melton
(74) *Attorney, Agent, or Firm* — Sughrue Mion, PLLC

(57) ABSTRACT

A robot includes: a light emitter configured to output light; a camera; and at least one processor configured to: obtain first information about an object using the camera while the light emitter is outputting the light, obtain second information about the object using the camera while the light emitter is not outputting the light, obtain third information about the object based on the first information and the second information, obtain information about an external light area based on at least one from among the first information, the second information, and the third information, and generate a driving path of the robot based on the information about the external light area.

20 Claims, 11 Drawing Sheets

(51) Int. Cl.
*G01S 17/89* (2020.01)
*G01S 17/931* (2020.01)
*G05D 111/10* (2024.01)

(56) References Cited

U.S. PATENT DOCUMENTS

| | | | |
|---|---|---|---|
| 10,345,437 B1* | 7/2019 | Russell | G01S 17/86 |
| 10,436,884 B2* | 10/2019 | Wu | G06T 7/136 |
| 10,775,794 B2 | 9/2020 | Chae et al. | |
| 11,341,615 B2 | 5/2022 | Toyoura | |
| 2009/0125175 A1 | 5/2009 | Park et al. | |
| 2012/0013745 A1 | 1/2012 | Kang et al. | |
| 2014/0257564 A1 | 9/2014 | Sun et al. | |
| 2018/0128919 A1 | 5/2018 | Ichikawa et al. | |
| 2018/0143640 A1 | 5/2018 | Chae et al. | |
| 2019/0353784 A1* | 11/2019 | Toledano | G05D 1/2435 |
| 2020/0122344 A1 | 4/2020 | Lee et al. | |
| 2020/0174484 A1 | 6/2020 | Eoh et al. | |
| 2021/0012520 A1 | 1/2021 | Zhou et al. | |
| 2021/0183016 A1 | 6/2021 | Toyoura | |

FOREIGN PATENT DOCUMENTS

| | | |
|---|---|---|
| JP | 5-209746 A | 8/1993 |
| JP | 6-273169 A | 9/1994 |
| JP | 7-140225 A | 6/1995 |
| JP | 2003-185412 A | 7/2003 |
| JP | 2020-30204 A | 2/2020 |
| KR | 10-2009-0048104 A | 5/2009 |
| KR | 10-2014-0109175 A | 9/2014 |
| KR | 10-1553731 B1 | 9/2015 |
| KR | 10-2015-0126497 A | 11/2015 |
| KR | 10-2015-0127937 A | 11/2015 |
| KR | 10-1578864 B1 | 12/2015 |
| KR | 10-2018-0133829 A | 12/2018 |
| KR | 10-2018-0136294 A | 12/2018 |
| WO | 2017/034062 A1 | 3/2017 |
| WO | 2019/044571 A1 | 3/2019 |
| WO | 2019/194602 A1 | 10/2019 |

OTHER PUBLICATIONS

Communication issued Oct. 11, 2023 by the European Patent Office in European Patent Application No. 21856133.0.
International Search Report (PCT/ISA/210) dated Nov. 8, 2021, issued by the International Searching Authority in International Application No. PCT/KR/2021/010331.
Written Opinion (PCT/ISA/237) dated Nov. 8, 2021, issued by the International Searching Authority in International Application No. PCT/KR/2021/010331.

* cited by examiner

ROBOT AND CONTROL METHOD THEREOF

CROSS-REFERENCE TO RELATED APPLICATIONS

This application is a by-pass continuation application of International Application No. PCT/KR2021/010331, filed on Aug. 5, 2021, which is based on and claims priority to Korean Patent Application No. 10-2020-0100228, filed on Aug. 11, 2020 in the Korean Intellectual Property Office, the disclosures of which are incorporated by reference herein in their entireties.

BACKGROUND

1. Field

The disclosure relates to a robot and a control method thereof. More particularly, the disclosure relates to a robot that generates a driving path based on information about an external light area and a control method thereof.

2. Description of Related Art

Recently, developments in electronic technology have driven research into autonomous robots. To allow for smooth driving of a robot, it is important to obtain distance information related to the surroundings of the robot. As an example of a method of obtaining such distance information, the robot may output light and obtain distance information to an object by receiving light reflected from the object.

When a robot is driving in an environment that is exposed to an external light such as sunlight, the robot may receive the external light. In this case, the robot may recognize the external light as an object because it is not able to distinguish a light output by the robot and the external light, and accordingly, there has been a problem of driving inefficiently in such an environment.

Accordingly, there is a growing need for technology which prevents a false detection of an object and generates an effective driving path.

SUMMARY

Provided is a robot that generates an effective driving path based on information about an external light area.

Additional aspects will be set forth in part in the description which follows and, in part, will be apparent from the description, or may be learned by practice of the presented embodiments.

According to an aspect of the disclosure, a robot includes: a light emitter configured to output light; a camera; and at least one processor configured to: obtain first information about an object using the camera while the light emitter is outputting the light, obtain second information about the object using the camera while the light emitter is not outputting the light, obtain third information about the object based on the first information and the second information, obtain information about an external light area based on at least one from among the first information, the second information, and the third information, and generate a driving path of the robot based on the information about the external light area.

The first information may include a first image captured by the camera, wherein the first image includes a first image pixel value, the second information may include a second image captured by the camera, wherein the second image includes a second image pixel value, and the third information may include a third image in which the second image pixel value is deducted from the first image pixel value.

The at least one processor may be further configured to: obtain position information of a pixel group of the second image, wherein the pixel group of the second image includes a size greater than or equal to a threshold value, and obtain the obtained position information of the pixel group of the second image as position information about the external light area.

The at least one processor may be further configured to: identify at least one pixel group of the first image, wherein the at least one identified pixel group of the first image includes a size greater than or equal to a threshold value, obtain thickness information of an area that corresponds to the at least one identified pixel group of the first image, and compare the obtained thickness information with pre-stored thickness information of the light and identify whether the area that corresponds to the at least one identified pixel group of the first image corresponds to the external light area.

The at least one processor may be further configured to obtain the thickness information based on a position information of a first pixel positioned at a lower end from among the at least one identified pixel group of the first image and a position information of a second pixel positioned at an upper end from among the at least one identified pixel group of the first image.

The first information may include first distance information to at least one object included in a first image captured by the camera, the second information may include second distance information to at least one object included in a second image captured by the camera, and the third information may include third distance information in which the second distance information is deducted from the first distance information.

The at least one processor may be further configured to: identify distance information within a threshold range from among the second distance information, obtain position information of a pixel of the second image that corresponds to the identified distance information, and obtain the obtained position information of the pixel of the second image as position information about the external light area.

The at least one processor may be further configured to: obtain distance information to an object included in the third image, and generate a driving path that bypasses the object and the external light area based on the distance information to the object and information about the external light area.

According to an aspect of the disclosure, a method of controlling a robot, the method including: obtaining first information about an object using a camera of the robot while a light emitter of the robot is outputting light; obtaining second information about the object using the camera while the light emitter is not outputting the light; obtaining third information about the object based on the first information and the second information; obtaining information about an external light area based on at least one from among the first information, the second information, and the third information; and generating a driving path of the robot based on the information about the external light area.

The first information may include a first image captured by the camera, the second information may include a second image captured by the camera, and the third information may include a third image in which a pixel value of the second image is deducted from a pixel value of the first image.

The obtaining information about the external light area may include: obtaining position information of a pixel group of the second image, wherein the pixel group of the second image includes a size greater than or equal to a threshold value; and obtaining the obtained position information of the pixel group of the second image as position information about the external light area.

The obtaining information about the external light area may include: identifying at least one pixel group of the first image including a size greater than or equal to a threshold value; obtaining thickness information of an area that corresponds to the at least one identified pixel group of the first image; and comparing the obtained thickness information with pre-stored thickness information of the light and identifying whether the area that corresponds to the at least one identified pixel group of the first image corresponds to the external light area.

The obtaining thickness information may include obtaining thickness information of the area that corresponds to the at least one identified pixel group based on position information of a first pixel positioned at a lower end from among the at least one identified pixel group of the first image and position information of a second pixel positioned at an upper end from among the at least one identified pixel group of the first image.

The first information may include first distance information to at least one object included in a first image captured by the camera, the second information may include second distance information to at least one object included in a second image captured by the camera, and the third information may include third distance information in which the second distance information is deducted from the first distance information.

The obtaining information about the external light area may include: identifying distance information within a threshold range from among the second distance information; obtaining position information of a pixel of the second image that corresponds to the identified distance information; and obtaining the obtained position information of the pixel of the second image as position information about the external light area.

According to an aspect of the disclosure, a non-transitory computer readable medium having instructions stored therein, which when executed by an at least one processor cause the at least one processor to execute a method of controlling a robot, the method including: obtaining first information about an object using a camera of the robot while a light emitter of the robot is outputting a light; obtaining second information about the object using the camera while the light emitter is not outputting the light; obtaining third information about the object based on the first information and the second information; obtaining information about an external light area based on at least one from among the first information, the second information, and the third information; and generating a driving path of the robot based on the information about the external light area.

The first information may include a first image captured by the camera, the second information may include a second image captured by the camera, and the third information may include a third image in which a pixel value of the second image is deducted from a pixel value of the first image.

The obtaining the information about the external light area may include: obtaining position information of a pixel group of the second image, wherein the pixel group of the second image includes a size greater than or equal to a threshold value; and obtaining the obtained position information of the pixel group of the second image as a position information about the external light area.

The obtaining an information about the external light area may include: identifying at least one pixel group of the first image including a size greater than or equal to a threshold value; obtaining thickness information of an area that corresponds to the at least one identified pixel group of the first image; and comparing the obtained thickness information with a pre-stored thickness information and identifying whether the area that corresponds to the at least one identified pixel group of the first image corresponds to the external light area.

The obtaining thickness information may include obtaining thickness information of the area that corresponds to the at least one identified pixel group based on a position information of a first pixel positioned at a lower end from among the at least one identified pixel group of the first image and a position information of a second pixel positioned at an upper end from among the at least one identified pixel group of the first image.

BRIEF DESCRIPTION OF THE DRAWINGS

The above and other aspects, features and advantages of certain embodiments of the disclosure will be more apparent from the following descriptions taken into conjunction with the accompanied drawings, in which.

DETAILED DESCRIPTION

Figure 1:
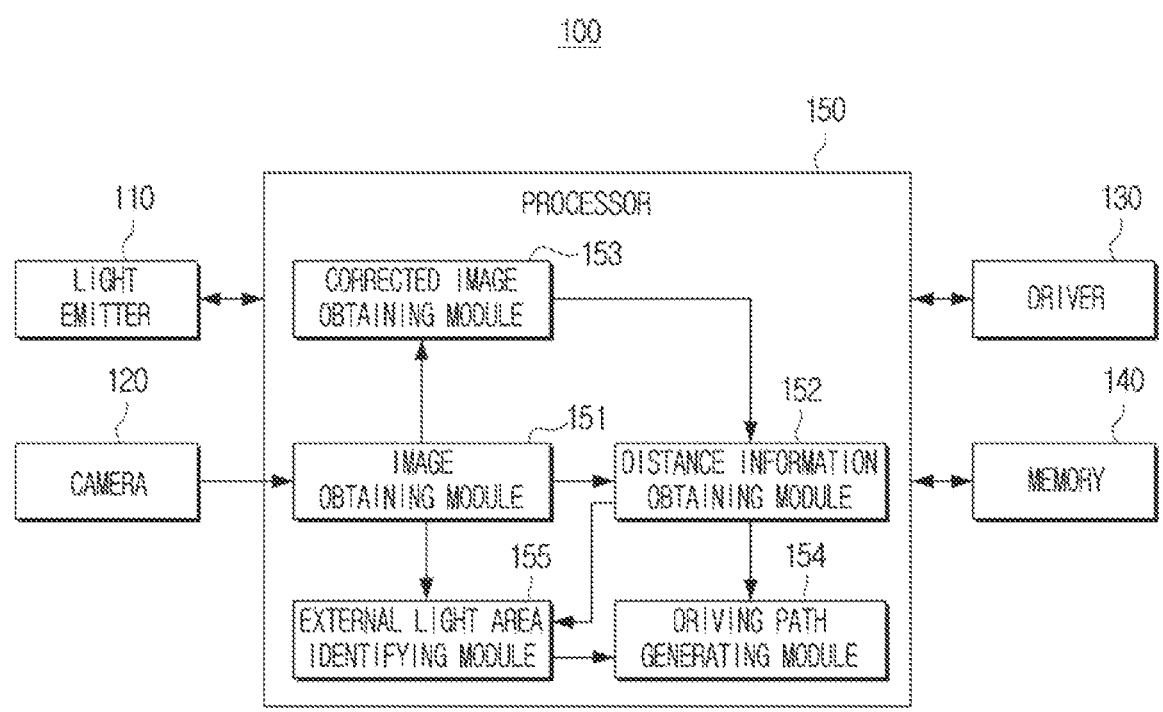
FIG. 1 is a block diagram illustrating a configuration of a robot according to an embodiment of the disclosure.

Terms used in the disclosure will be briefly described, and the disclosure will be described in detail.

The terms used in describing the embodiments of the disclosure are general terms selected that are currently widely used considering their function herein. However, the terms may change depending on intention, legal or technical interpretation, emergence of new technologies, and the like of those of ordinary skill in the related art. Further, in certain cases, there may be terms arbitrarily selected, and in this case, the meaning of the term will be disclosed in greater detail in the corresponding description. Accordingly, the terms used herein should be defined based on the meaning of the term and the overall context of the disclosure, and not simply by its designation.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments do not limit the scope of the disclosure to a specific embodiment, but they should be understood to include all modifications, equivalents or alternatives of the embodiments included in the ideas and the technical scopes disclosed herein.

The terms such as "first," and "second" may be used in describing the various elements, but the elements are not to be limited by the terms. The terms may be used only to distinguish one element from another.

A singular expression includes a plural expression, unless otherwise specified. In the disclosure, it is to be understood that the terms such as "consist" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

Embodiments of the disclosure will be described in detail below with reference to the accompanying drawings to aid in the understanding of those of ordinary skill in the art. However, the disclosure may be realized in various different forms and it should be noted that the disclosure is not limited to the various embodiments described herein. Further, in the drawings, parts not relevant to the description have been omitted to clearly describe the disclosure, and like reference numerals may be used to indicate like elements throughout the disclosure.

FIG. 1 is a block diagram illustrating a configuration of a robot according to an embodiment of the disclosure.

Referring to FIG. 1, a robot 100 may include a light emitter 110, a camera 120, a driver 130, a memory 140, and a processor 150.

The light emitter 110 may output light for obtaining distance information to an object. Herein, distance information to an object may mean a distance between the robot 100 and the object. The light emitter 110 may output light at a pre-set time interval. For example, the light emitter 110 may output light for a first time period, and not output light for a second time period. The light emitter 110 may output a laser having various forms. For example, the light emitter 110 may output a laser of a line beam form in a direction horizontal with a ground. The light emitter 110 may be implemented as various laser devices. For example, the light emitter 110 may be implemented as a laser diode (LD) or a Vertical Cavity Surface Emitting Laser (VCSEL).

The camera 120 may capture the surroundings of the robot 100, and obtain reflective light that is reflected from an object. Specifically, the camera 120 may obtain reflective light that is reflected from the object after being output from the light emitter 110. In addition, the camera 120 may obtain external light. Here, the external light may include sunlight. The camera 120 may include a sensor device of various types. For example, the camera 120 may include a charge-coupled device (CCD) sensor, a complementary metal-oxide-semiconductor (CMOS) sensor, a photodiode (PD) and an avalanche photodiode (APD).

The driver 130 may be a configuration for moving the robot 100. Specifically, the driver 130 may include an actuator for the driving of the robot 100.

The memory 140 may store an operating system (OS) for controlling the overall operation of the elements of the robot 100 and commands or data associated with the elements of the robot 100. To this end, the memory 140 may be implemented as a non-volatile memory (e.g., hard disk, solid state drive (SSD), flash memory), a volatile memory, and the like.

The processor 150 may control the overall operation of the robot 100. The processor 150 may include an image obtaining module 151, a distance information obtaining module 152, a corrected image obtaining module 153, a driving path generating module 154, and an external light area identifying module 155.

The image obtaining module 151 may obtain an image of the surroundings of the robot 100 using the camera 120. The image obtaining module 151 may generate an image based on light obtained by the camera 120. In the image obtained through the image obtaining module 151, an object present in the surroundings of the robot 100 and light reflected from the object after being output from the light emitter 110 may be included. For example, the image obtaining module 151 may obtain a first image while the light emitter 110 is outputting light, and obtain a second image while the light emitter 110 is not outputting light. At this time, light output from the light emitter 110 may be included in the first image, but light output from the light emitter 110 may not be included in the second image.

The distance information obtaining module 152 may analyze an image obtained through the image obtaining module 151 and obtain distance information to an object included in the image. For example, the distance information obtaining module 152 may obtain distance information to an object based on triangulation. Specifically, the distance information obtaining module 152 may identify a pixel (or, a pixel group) having a size within a threshold range from among pixels in an image. Then, the distance information obtaining module 152 may calculate a distance to an object corresponding to the identified pixel (or pixel group) based on a position of the identified pixel (or pixel group). The distance information obtaining module 152 may calculate the distance to an object based on the position of the pixel (or pixel group) corresponding to light output from the light emitter 110 on the image.

Based on the distance information obtained through the distance information obtaining module 152, the robot may generate a driving path and drive according to the generated driving path. The light obtained by the camera 120 may include not only light output from the light emitter 110, but also external light (e.g., sunlight). Accordingly, an external light area (or external light) may be present in the image obtained through the image obtaining module 151. When distance information is obtained based on the image in which the external light area is included and the driving path is generated, accuracy of the distance information and driving efficiency of the robot 100 may be reduced because the external light area is processed like an object (or obstacle). That is, despite an object not actually being present, based on the external light being recognized as an object, a driving path that bypasses the external light area may be generated.

Figure 2:
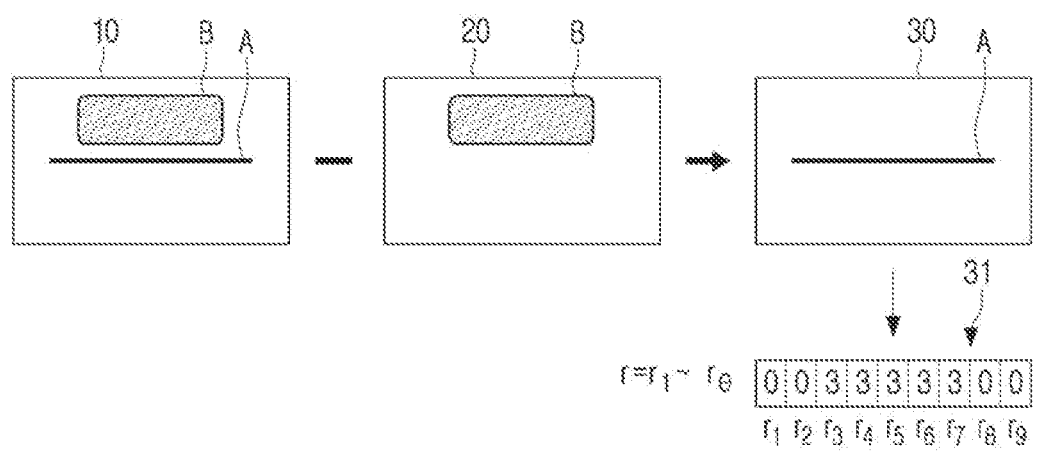
FIG. 2 is a diagram illustrating a method of obtaining distance information according to an embodiment of the disclosure.

As described above, in order to prevent driving efficiency of the robot 100 from being reduced because of the presence of external light, the corrected image obtaining module 153 may obtain a new image with the external light area removed. As shown in FIG. 2, the corrected image obtaining module 153 may generate a third image 30 based on a first image 10 obtained while the light emitter 110 is outputting light and a second image 20 obtained while the light emitter 110 is not outputting light. Specifically, the corrected image obtaining module 153 may generate the third image 30 by deducting a pixel value of the second image 20 from a pixel value of the first image 10. As shown in FIG. 2, the first image 10 may include an area A corresponding to light output from the light emitter 110 (or, laser area) and an external light area B, but the third image 30 may not include the external light area B.

The distance information obtaining module 152 may obtain third distance information 31 based on the third image 30 with the external light area removed. The distance information obtaining module 152 may obtain third distance information 31 based on a position of the laser area A on the third image 30. The third distance information 31 may include distance data r that corresponds to each of a plurality of angles (Θ).

The driving path generating module 154 may generate a driving path based on the third distance information 31. The processor 150 may control the driver 130 for the robot 100 to drive along the generated driving path. As described above, by obtaining distance information based on the third image, accuracy of the distance information may be enhanced and driving efficiency of the robot 100 may be enhanced.

Figure 3:
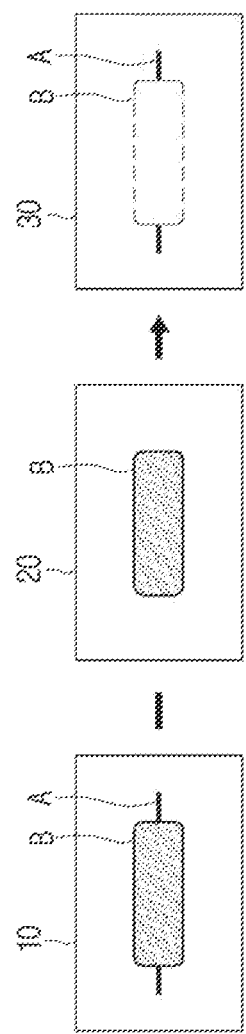
FIG. 3 is a diagram illustrating an image according to an embodiment of the disclosure.

As shown in FIG. 3, the laser area A and the external light area B may overlap. Because the corrected image obtaining module 153 generates the third image 30 by deducting the pixel value of the second image 20 from the pixel value of the first image 10, a portion from among not only the external light area B but also the laser area A may be removed. In this case, when a driving path is generated based on the third image 30, the removed laser area A is analyzed when generating the driving path, and the removal of laser area A may cause the robot 100 to collide with an object present in the external light area B.

To prevent problems such as the above, when the laser area A and the external light area B are overlapped, the external light area identifying module 155 may identify the external light area B, and the driving path generating module 154 may generate a driving path to drive bypassing the identified external light area B.

The external light area identifying module 155 may identify the external light area B based on information about an object. Here, the information about an object may include an image which captured an object and distance information to an object. For example, the information about an object may include the first image captured while the light emitter 110 is outputting light and the second image captured while the light emitter 110 is not outputting light. Alternatively, the information about an object may include distance information to an object included in the first image and distance information to an object included in the second image.

A method of identifying the external light area according to various embodiments will be described below.

According to an embodiment, the external light area identifying module 155 may identify the external light area B by analyzing the first image 10. Specifically, the external light area identifying module 155 may identify a pixel (or, a pixel group) having a size greater than or equal to a threshold value from among pixels of the first image 10. The external light area identifying module 155 may identify an area that corresponds to the identified pixel (or, a pixel group). The external light area identifying module 155 may obtain thickness information of the identified area. The external light area identifying module 155 may obtain thickness information of the identified area based on position information of a pixel (or pixel group) positioned at a lower end and a pixel (or pixel group) positioned at an upper end from among the plurality of pixels (or pixel groups) having a size greater than or equal to a threshold value.

The external light area identifying module 155 may compare obtained information about a thickness with pre-stored information about a thickness of light and identify whether the area that corresponds to the identified pixel (or pixel group) corresponds to the external light area B. Here, the pre-stored information about the thickness of light may include a look-up table in which information about a position within the image and the thickness of light is matched and stored. For example, if a thickness of an area that corresponds to the identified pixel (or pixel group) is greater than a thickness stored in the look-up table, the external light area identifying module 155 may identify the area that corresponds to the identified pixel (or pixel group) as the external light area B. Alternatively, if a difference between the thickness of the area that corresponds to the identified pixel (or pixel group) and the thickness stored in the look-up table is greater than or equal to a threshold value, the external light area identifying module 155 may identify the area that corresponds to the identified pixel (or pixel group) as the external light area B.

The external light area identifying module 155 may identify the external light area B by analyzing a pattern of the first image 10. Specifically, the external light area identifying module 155 may identify the pixel (or pixel group) having a size greater than or equal to a threshold value from among the pixels of the first image 10. The external light area identifying module 155 may compare a pattern of an area that corresponds to the identified pixel (or pixel group) with a pre-stored pattern and identify the external light area B. For example, the external light area identifying module 155 may identify, based on obtaining a measure of similarity between a pre-stored pattern and the pattern of the area that corresponds to the identified pixel (or pixel group), and the obtained similarity being less than or equal to a threshold value, the identified area as the external light area B. Here, the pre-stored pattern may be defined based on a form of light (e.g., line beam form) that is output from the light emitter 110.

According to another embodiment, the external light area identifying module 155 may identify the external light area B by analyzing the second image 20. Specifically, the external light area identifying module 155 may identify a pixel (or pixel group) having a size greater than or equal to a threshold value from among the pixels of the second image 20. The external light area identifying module 155 may identify the area that corresponds to the identified pixel (or pixel group) as the external light area B. That is, because the second image 20 is an image obtained while the light emitter 110 is not outputting light, the external light area identifying module 155 may determine, based on a pixel (or pixel group) having a size greater than or equal to a threshold value being present in the second image 20, that the corresponding pixel (or pixel group) has a size greater than or equal to a threshold value according to the external light.

Figure 4A:
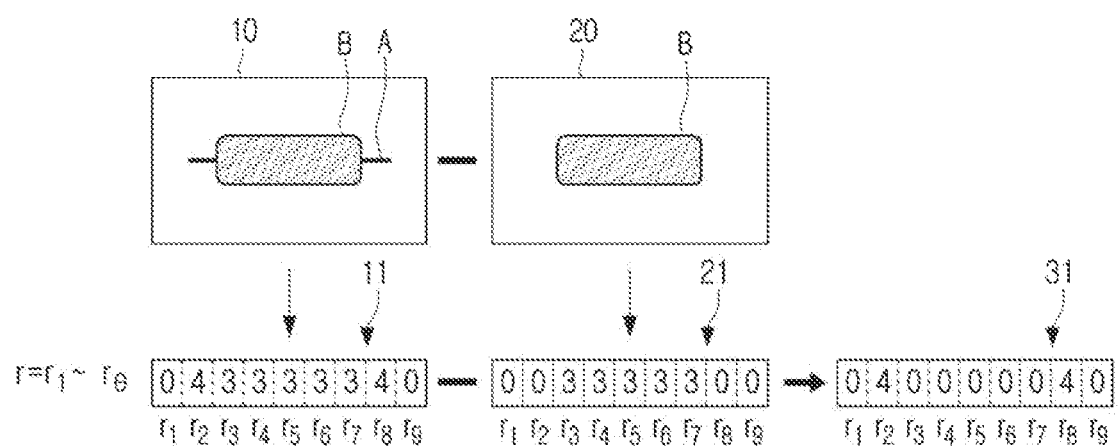
FIG. 4A is a diagram illustrating a method of obtaining information about an external light area according to an embodiment of the disclosure.

The external light area identifying module 155 may identify the external light area based on the distance information obtained through the distance information obtaining module 152. The distance information may include information of a distance from the robot 100, and an angle (or position) based on the robot 100. As shown in FIG. 4A, the distance information may include distance data r that corresponds respectively to the plurality of angles (θ). As described above, the distance information obtaining module 152 may obtain, using triangulation, first distance information 11 based on the first image 10, and second distance information 21 based on the second image 20.

The external light area identifying module 155 may identify the external light area B based on the second distance information 21. For example, the external light area identifying module 155 may obtain distance data ($r_3$, $r_4$, $r_5$, $r_6$, $r_7$) of a threshold range from among the second distance information 21. Then, the external light area identifying module 155 may obtain position information of pixels in the second image 20 corresponding to the obtained distance data ($r_3$, $r_4$, $r_5$, $r_6$, $r_7$). The external light area identifying module 155 may obtain position information of the obtained pixel (or pixel group) as position information about the external light area B.

The distance information obtaining module 152 may obtain third distance information 31 by deducting the second distance information 21 from the first distance information 11. Then, the driving path generating module 154 may generate a driving path based on the third distance information 31 and position information about the external light area B. In an example, the driving path generating module 154 may generate a driving path that bypasses the laser area A and the external light area B.

Figure 4B:
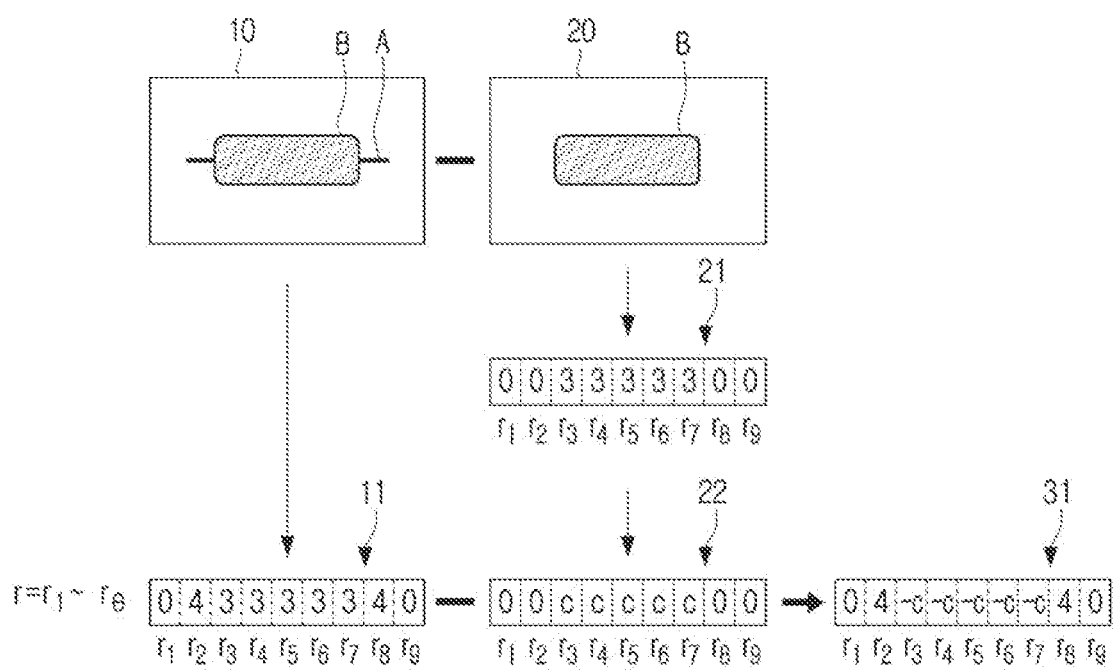
FIG. 4B is a diagram illustrating a method of obtaining information about an external light area according to another embodiment of the disclosure.

When the external light area B is identified based on the second distance information 21, the external light area identifying module 155 may change a value of distance data that corresponds to the identified external light area B as a pre-set value and store the same. For example, as shown in FIG. 4B, the external light area identifying module 155 may change the value of distance data ($r_3$, $r_4$, $r_5$, $r_6$, $r_7$) from among the second distance information 21 to a pre-set value c and store the same. Accordingly, the third distance information 31 obtained through the distance information obtaining module 152 may include distance data reflected with the pre-set value c. In this case, the driving path generating module 154 may generate a driving path that bypasses the area corresponding to the distance data ($r_3$, $r_4$, $r_5$, $r_6$, $r_7$) based on the value of distance data ($r_3$, $r_4$, $r_5$, $r_6$, $r_7$). As described above, the external light area identifying module 155 may change the distance data corresponding to the external light area B to a pre-set value so that it can be reflected when generating the driving path and store the same.

In FIG. 4A and FIG. 4B, although an embodiment of the distance information obtaining module 152 obtaining the third distance information 31 by deducting the second distance information 21 from the first distance information 11 has been described, the distance information obtaining module 152 may obtain the third distance information 31 based on the third image 30 obtained through corrected image obtaining module 153.

Figure 4C:
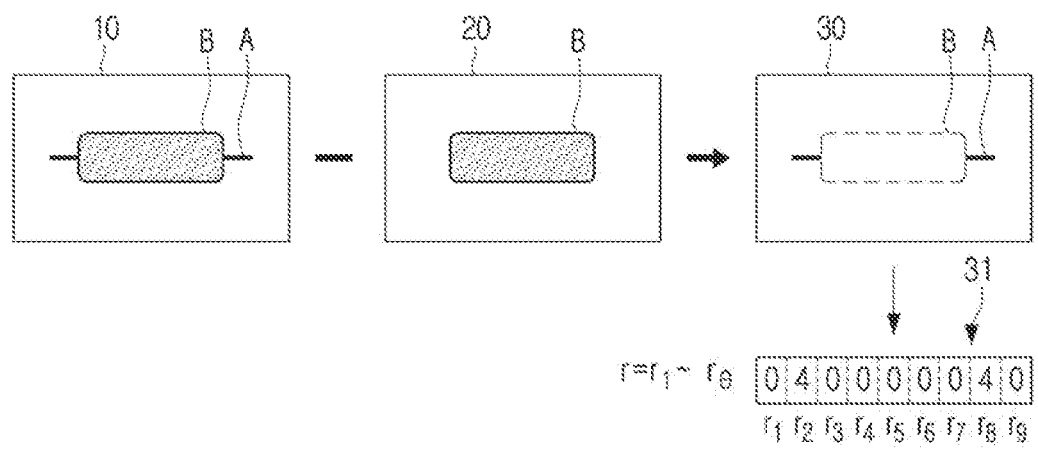
FIG. 4C is a diagram illustrating a method of obtaining information about an external light area according to still another embodiment of the disclosure.

Referring to FIG. 4C, the corrected image obtaining module 153 may generate the third image 30 by deducting the pixel value of the second image 20 from the pixel value of the first image 10. The robot 100 may move in-between a time point at which the first image 10 is captured and a time point at which the second image is captured. Accordingly, a matching of the positions of the pixel (or pixel group) of the first image 10 and the pixel (or pixel group) of the second image 20 may be needed. The corrected image obtaining module 153 may correct the position of the pixel (or pixel group) of the first image 10 or the second image 20 prior to deducting the pixel value of the second image 20 from the pixel value of the first image 10. Then, the distance information obtaining module 152 may generate the third image 30 by deducting the pixel value of the second image 20 from the pixel value of the first image 10. The distance information obtaining module 152 may obtain third distance information 31 which includes distance information to the laser area A based on the position of the pixel (or pixel group) corresponding to the laser area A included in the third image 30. That is, the distance information obtaining module 152 may obtain the third distance information 31 based on triangulation.

Each module of the processor 150 described above may be implemented with software, or implemented in a combined form with software and hardware.

In FIG. 1, a plurality of modules 151 to 155 are shown as one configuration of the processor 150. However, this is merely one embodiment, and the plurality of modules 151 to 155 may be stored in the memory 140. At this time, the processor 150 may load the plurality of modules 151 to 155 stored in the memory 140 from the non-volatile memory to the volatile memory and execute respective functions of the plurality of modules 151 to 155.

Figure 5:
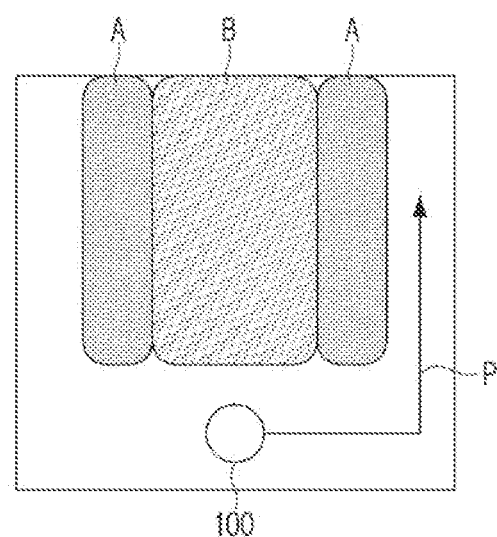
FIG. 5 is a map illustrating a driving path according to an embodiment of the disclosure.

FIG. 5 is a map illustrating a driving path of a robot according to an embodiment of the disclosure.

As shown in FIG. 5, the robot 100 may generate a driving path P that bypasses the laser area A and the external light area B. Because a robot of the related art generates a driving path based only on the third distance information 31 of FIG. 4A and FIG. 4B without taking into consideration the external light area B, the area at which a distance value from the third distance information 31 is 0 has been determined as a free space, and a driving path passing therethrough has been generated. Accordingly, the robot of the related art generated a driving path that passed through the external light area B, and if an object is present in the external light area B, there has been the problem of a collision accident occurring. On the other hand, because the robot 100 according to an embodiment of the disclosure generates a driving path taking into consideration not only the third distance information 31 but also the external light area B, a driving path that bypasses the external light area B may be generated, and driving stability may be enhanced according thereto.

In the above, the robot 100 has been described as obtaining the first image 10 while the light emitter 110 is outputting light, and obtaining the second image 20 while the light emitter 110 is not outputting light. However, this is merely one embodiment, and the robot 100 may be implemented such that the second image 20 can be obtained while the light emitter 110 is outputting light.

Figure 6:
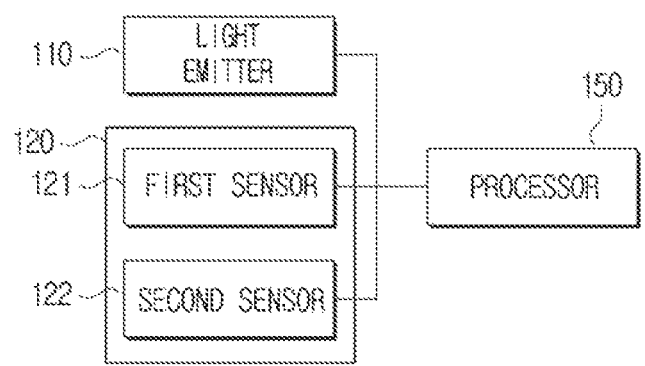
FIG. 6 is a block diagram illustrating a camera according to an embodiment of the disclosure.

FIG. 6 is a block diagram of a robot illustrating a method of obtaining a second image according to an embodiment of the disclosure. Referring to FIG. 6, the camera 120 may include a first sensor 121 and a second sensor 122. At this time, the second sensor 122 may include a filter (e.g., band reject filter) which rejects light corresponding to a wavelength of light (e.g., 905 nm) that is output from the light emitter 110. Accordingly, the second sensor 122 may obtain the second image 20 which does not include the laser area even when the light emitter 110 is outputting light. Further, the first sensor 121 may obtain the first image 10 which includes the laser area. The processor 150 may obtain the third image 30 with the external light area removed based on the first image 10 and the second image 20.

Figure 7:
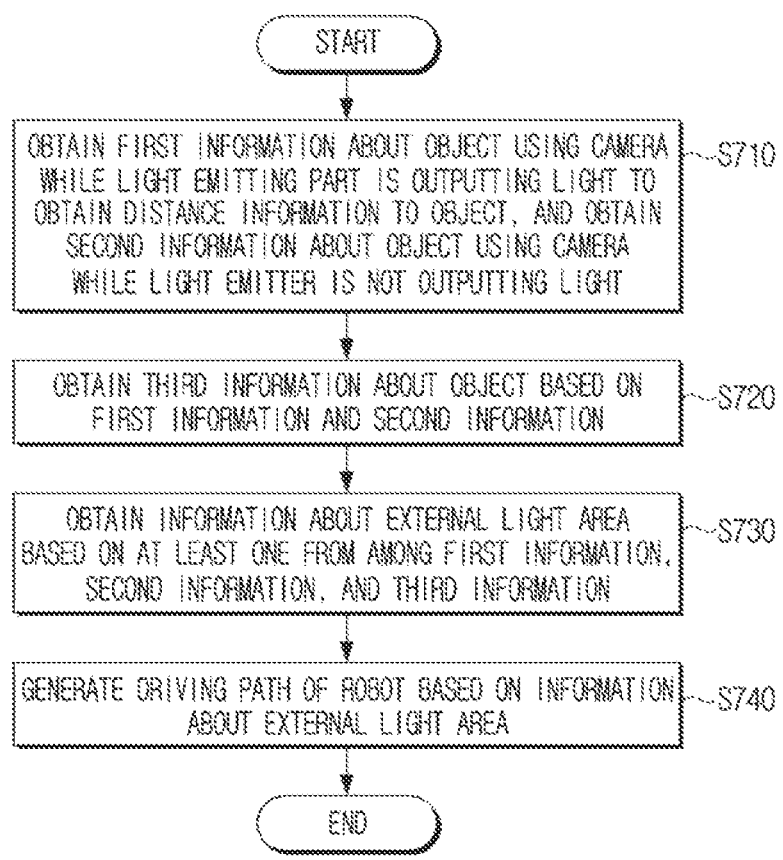
FIG. 7 is a flowchart illustrating a control method of a robot according to an embodiment of the disclosure.

FIG. 7 is a flowchart illustrating a control method of a robot according to an embodiment of the disclosure.

The robot 100 may obtain first information about an object using a camera while the light emitter is outputting light to obtain distance information to the object, and obtain second information about the object using the camera while the light emitter is not outputting light (S710). Here, the first information and the second information may be an image captured through the camera. Alternatively, the first information and the second information may be distance information obtained based on the image. In the disclosure, information may include an image and distance information.

The robot 100 may obtain third information about an object based on the first information and the second information (S720). Based on the first information and the second information being an image, the robot 100 may deduct a pixel value of the second information from a pixel value of the first information and obtain the third information (third image). If the first information and the second information are distance data to each area within an image, the robot 100 may obtain the third information by deducting the second information from the first information.

The robot 100 may obtain information about the external light area based on at least one from among the first information, the second information, and the third information (S730). In an example, the robot 100 may obtain information about the external light area by analyzing the second information. Specifically, based on the second information being an image, the robot 100 may obtain position information of a pixel (or pixel group) having a size greater than or equal to a threshold value from among the pixels of the second information. The robot 100 may obtain the obtained position information of the pixel (or pixel group) as position information about the external light area. Based on the second information being distance information, the robot 100 may identify distance information within a threshold range from among the second information. The robot 100 may obtain position information that corresponds to the identified distance information, and obtain the obtained position information of the pixel (or pixel group) as position information about the external light area.

The robot 100 may generate a driving path of the robot 100 based on information about the external light area (S740). The robot 100 may generate a driving path that bypasses the external light area. Accordingly, driving stability of the robot 100 may be enhanced.

Figure 8:
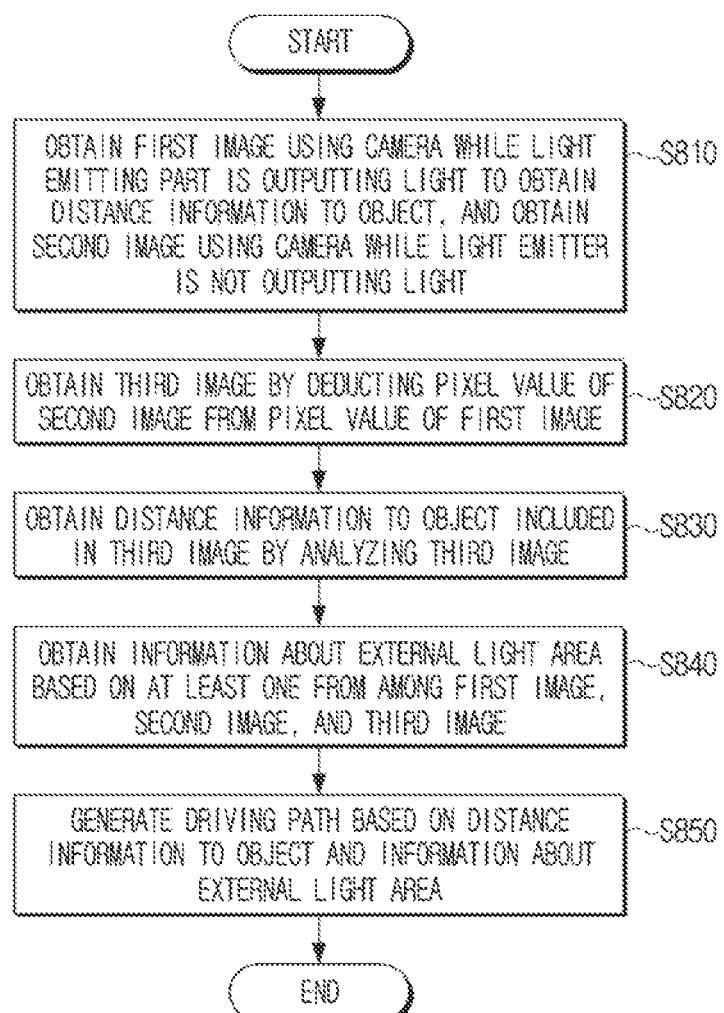
FIG. 8 is a flowchart illustrating a control method of a robot according to an embodiment of the disclosure.

FIG. 8 is a flowchart illustrating a control method of a robot according to an embodiment of the disclosure.

The robot 100 may obtain the first image using the camera while the light emitter is outputting light to obtain distance information to an object, and obtain the second image using the camera while the light emitter is not outputting light (S810). Accordingly, while information about light output from the light emitter may be included in the first image, information about light output from the light emitter may not be included in the second image.

The robot 100 may obtain the third image by deducting the pixel value of the second image from the pixel value of the first image (S820). Accordingly, information about the external light area may not be included in the third image. The robot 100 may obtain distance information to an object included in the third image by analyzing the third image (S830). At this time, the robot 100 may obtain distance information to an object based on a position of light output from the light emitter in the third image.

The robot 100 may obtain information about the external light area based on at least one from among the first image, the second image, and the third image (S840). In an example, the robot 100 may identify a pixel (or pixel group) having a size greater than or equal to a threshold value from among the pixels of the first image. At this time, the robot 100 may obtain thickness information of an area that corresponds to the identified pixel (or pixel group). Then, the robot 100 may compare the obtained thickness information with the pre-stored thickness information and identify whether the area corresponding to the identified pixel (or pixel group) corresponds to the external light area. In another example, the robot 100 may identify the external light area included in the first image by comparing and analyzing a pattern of the first image with a pre-stored pattern.

The robot 100 may generate a driving path based on distance information to an object and information about the external light area (S850). The robot 100 may generate a driving path so as to drive spaced apart by a pre-set distance or more from the object and the external light area.

Figure 9:
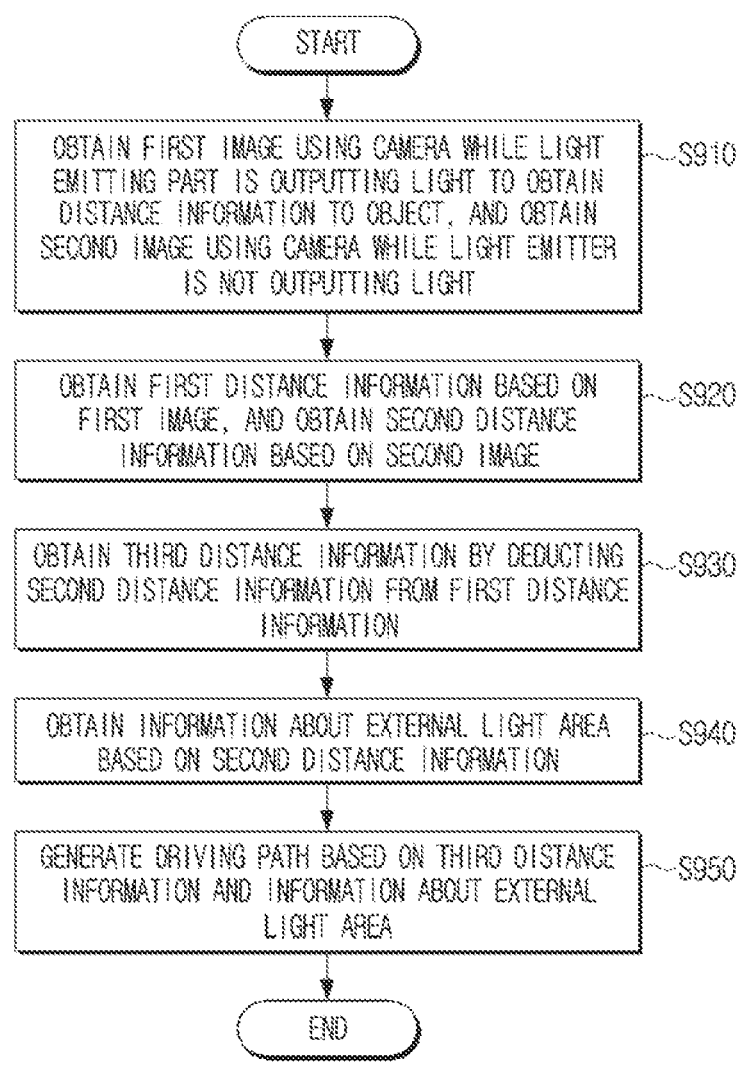
FIG. 9 is a flowchart illustrating a control method of a robot according to an embodiment of the disclosure.

FIG. 9 is a flowchart illustrating a control method of a robot according to an embodiment of the disclosure.

The robot 100 may obtain the first image using the camera while the light emitter is outputting light to obtain distance information to an object, and obtain the second image using the camera while the light emitter is not outputting light (S910). Because the operation corresponds to operation S810 in FIG. 8, the detailed description thereof will be omitted.

The robot 100 may obtain first distance information based on the first image, and obtain second distance information based on the second image (S920). The robot 100 may obtain the first distance information and the second distance information based on triangulation. Then, the robot 100 may obtain third distance information by deducting the second distance information from the first distance information (S930).

The robot 100 may obtain information about the external light area based on the second distance information (S940). The robot 100 may identify distance information within a threshold range from among the second distance information, and obtain position information of a pixel of the second image that corresponds to the identified distance information. The robot 100 may obtain the obtained position information of the pixel as position information about the external light area.

The robot 100 may generate a driving path based on the third distance information and information about the external light area (S950). The robot 100 may generate, based on the distance information to an object and the position information of the external light area included in the third distance information, a driving path so as to drive spaced apart by a pre-set distance or more from the object and the external light area. That is, the robot 100 may generate a driving path that bypasses the object and the external light area.

The various embodiments described above may be implemented in a computer or in a recording medium readable by a device similar to a computer using a software, a hardware, or a combination thereof. In some cases, the embodiments described in the disclosure may be implemented by the processor on its own. Based on a software implementation, embodiments of processes and functions described in the disclosure may be implemented with separate software modules. Each of the above-described software modules may perform at least one function and operation described in the disclosure.

Computer instructions for performing processing operations according to the various embodiments described above may be stored in a non-transitory computer-readable medium. The computer instructions stored in this non-transitory computer-readable medium may cause a specific device to perform a processing operation according to the above-described various embodiments when executed by a processor.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A robot comprising:
   a light emitter configured to output light;
   a camera; and
   at least one processor configured to:
   obtain first information about an object using the camera while the light emitter is outputting the light,
   obtain second information about the object using the camera while the light emitter is not outputting the light,
   obtain third information about the object based on the first information and the second information,
   obtain information about an external light area based on at least one from among the first information, the second information, and the third information, and
   generate a driving path of the robot based on the information about the external light area.

2. The robot of claim 1, wherein the first information comprises a first image captured by the camera, wherein the first image comprises a first image pixel value,
   wherein the second information comprises a second image captured by the camera, wherein the second image comprises a second image pixel value, and
   wherein the third information comprises a third image in which the second image pixel value is deducted from the first image pixel value.

3. The robot of claim 2, wherein the at least one processor is further configured to:
   obtain position information of a pixel group of the second image, wherein the pixel group of the second image comprises a size greater than or equal to a threshold value, and
   obtain the obtained position information of the pixel group of the second image as position information about the external light area.

4. The robot of claim 2, wherein the at least one processor is further configured to:
   identify at least one pixel group of the first image, wherein the at least one identified pixel group of the first image comprises a size greater than or equal to a threshold value,
   obtain thickness information of an area that corresponds to the at least one identified pixel group of the first image, and
   compare the obtained thickness information with pre-stored thickness information of the light and identify whether the area that corresponds to the at least one identified pixel group of the first image corresponds to the external light area.

5. The robot of claim 4, wherein the at least one processor is further configured to obtain the thickness information based on a position information of a first pixel positioned at a lower end from among the at least one identified pixel group of the first image and a position information of a second pixel positioned at an upper end from among the at least one identified pixel group of the first image.

6. The robot of claim 2, wherein the at least one processor is further configured to:
   obtain distance information to an object comprised in the third image, and
   generate a driving path that bypasses the object and the external light area based on the distance information to the object and information about the external light area.

7. The robot of claim 1, wherein the first information comprises first distance information to at least one object comprised in a first image captured by the camera,
   wherein the second information comprises second distance information to at least one object comprised in a second image captured by the camera, and
   wherein the third information comprises third distance information in which the second distance information is deducted from the first distance information.

8. The robot of claim 7, wherein the at least one processor is further configured to:
   identify distance information within a threshold range from among the second distance information,
   obtain position information of a pixel of the second image that corresponds to the identified distance information, and
   obtain the obtained position information of the pixel of the second image as position information about the external light area.

9. A method of controlling a robot, the method comprising:
   obtaining first information about an object using a camera of the robot while a light emitter of the robot is outputting light;
   obtaining second information about the object using the camera while the light emitter is not outputting the light;
   obtaining third information about the object based on the first information and the second information;
   obtaining information about an external light area based on at least one from among the first information, the second information, and the third information; and
   generating a driving path of the robot based on the information about the external light area.

10. The method of claim 9, wherein the first information comprises a first image captured by the camera,
    wherein the second information comprises a second image captured by the camera, and
    wherein the third information comprises a third image in which a pixel value of the second image is deducted from a pixel value of the first image.

11. The method of claim 10, wherein the obtaining information about the external light area comprises:
    obtaining position information of a pixel group of the second image, wherein the pixel group of the second image comprises a size greater than or equal to a threshold value; and
    obtaining the obtained position information of the pixel group of the second image as position information about the external light area.

12. The method of claim 10, wherein the obtaining information about the external light area comprises:
- identifying at least one pixel group of the first image comprising a size greater than or equal to a threshold value;
- obtaining thickness information of an area that corresponds to the at least one identified pixel group of the first image; and
- comparing the obtained thickness information with pre-stored thickness information of the light and identifying whether the area that corresponds to the at least one identified pixel group of the first image corresponds to the external light area.

13. The method of claim 12, wherein the obtaining thickness information comprises obtaining thickness information of the area that corresponds to the at least one identified pixel group based on position information of a first pixel positioned at a lower end from among the at least one identified pixel group of the first image and position information of a second pixel positioned at an upper end from among the at least one identified pixel group of the first image.

14. The method of claim 9, wherein the first information comprises first distance information to at least one object comprised in a first image captured by the camera,
- wherein the second information comprises second distance information to at least one object comprised in a second image captured by the camera, and
- wherein the third information comprises third distance information in which the second distance information is deducted from the first distance information.

15. The method of claim 14, wherein the obtaining information about the external light area comprises:
- identifying distance information within a threshold range from among the second distance information;
- obtaining position information of a pixel of the second image that corresponds to the identified distance information; and
- obtaining the obtained position information of the pixel of the second image as position information about the external light area.

16. A non-transitory computer readable medium having instructions stored therein, which when executed by an at least one processor cause the at least one processor to execute a method of controlling a robot, the method comprising:
- obtaining first information about an object using a camera of the robot while a light emitter of the robot is outputting a light;
- obtaining second information about the object using the camera while the light emitter is not outputting the light;
- obtaining third information about the object based on the first information and the second information;
- obtaining information about an external light area based on at least one from among the first information, the second information, and the third information; and
- generating a driving path of the robot based on the information about the external light area.

17. The non-transitory computer readable medium of claim 16, wherein the first information comprises a first image captured by the camera,
- wherein the second information comprises a second image captured by the camera, and
- wherein the third information comprises a third image in which a pixel value of the second image is deducted from a pixel value of the first image.

18. The non-transitory computer readable medium of claim 17, wherein the obtaining the information about the external light area comprises:
- obtaining position information of a pixel group of the second image, wherein the pixel group of the second image comprises a size greater than or equal to a threshold value; and
- obtaining the obtained position information of the pixel group of the second image as a position information about the external light area.

19. The non-transitory computer readable medium of claim 17, wherein the obtaining an information about the external light area comprises:
- identifying at least one pixel group of the first image comprising a size greater than or equal to a threshold value;
- obtaining thickness information of an area that corresponds to the at least one identified pixel group of the first image; and
- comparing the obtained thickness information with a pre-stored thickness information and identifying whether the area that corresponds to the at least one identified pixel group of the first image corresponds to the external light area.

20. The non-transitory computer readable medium of claim 19, wherein the obtaining thickness information comprises obtaining thickness information of the area that corresponds to the at least one identified pixel group based on a position information of a first pixel positioned at a lower end from among the at least one identified pixel group of the first image and a position information of a second pixel positioned at an upper end from among the at least one identified pixel group of the first image.

* * * * *